(No Model.) 2 Sheets—Sheet 1.
L. GRANGER & E. F. SIBLEY.
FRUIT DRIER.
No. 278,701. Patented June 5, 1883.
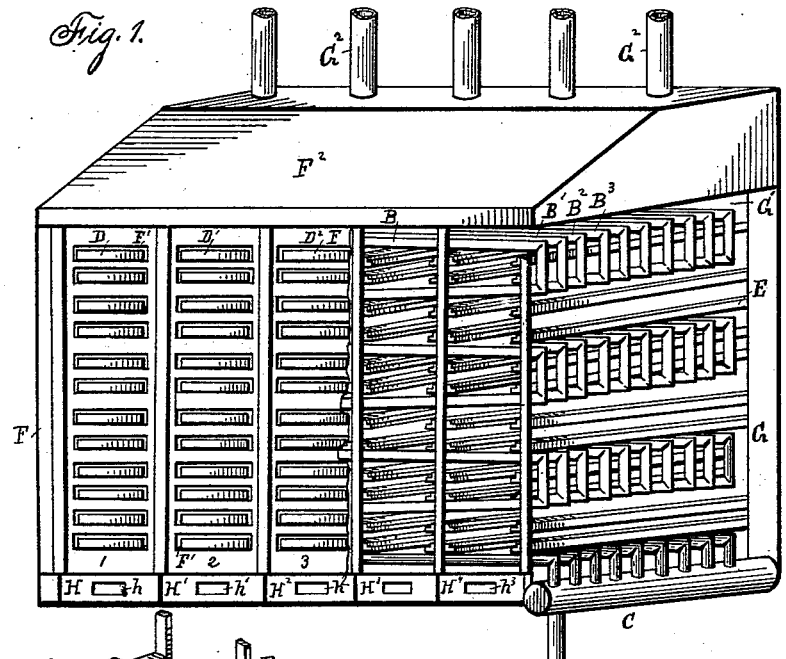
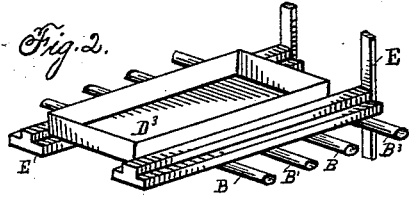
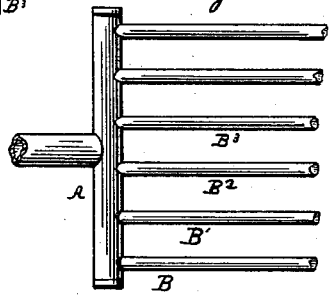
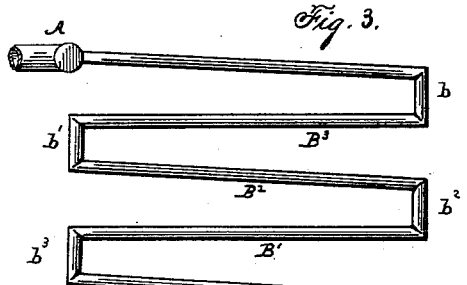
WITNESSES
Samuel E. Thomas.
N. S. Wright.
INVENTOR
Lewis Granger
Ezra F. Sibley
By W. W. Leggett
Attorney

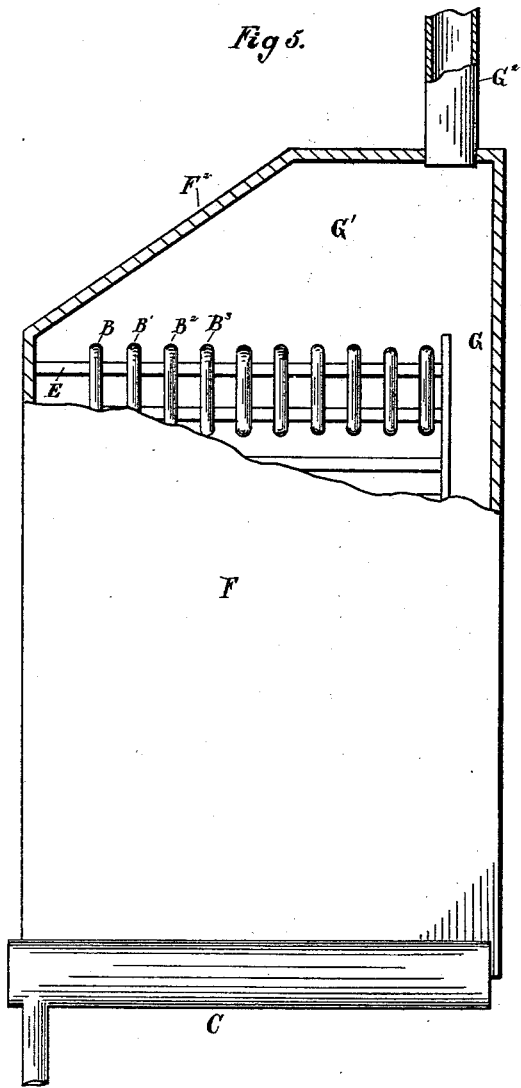

UNITED STATES PATENT OFFICE.

LEWIS GRANGER AND EZRA F. SIBLEY, OF ARMADA, MICHIGAN.

FRUIT-DRIER.

SPECIFICATION forming part of Letters Patent No. 278,701, dated June 5, 1883.

Application filed February 5, 1883. (No model.)

*To all whom it may concern:*

Be it known that we, LEWIS GRANGER and EZRA F. SIBLEY, of Armada, county of Macomb, State of Michigan, have invented a new and useful Improvement in Fruit-Driers; and we declare the following to be a full, clear, and exact description of the same, such as will enable others skilled in the art to which it pertains to make and use it, reference being had to the accompanying drawings, which form a part of this specification.

Our invention consists in the combination of devices and appliances hereinafter specified, and more particularly pointed out in the claim.

In the drawings, Figure 1 is a perspective view of an apparatus embodying our invention, showing a portion of the casing broken away. Fig. 2 is a separate view, showing details. Fig. 3 is a front elevation. Fig. 4 is a horizontal section, showing the arrangement of the steam-pipes; and Fig. 5 is an end elevation, broken away to show the vapor-chamber and draft or vapor flue.

The object of our invention is to construct an improved fruit-drier by means of which quantities of fruits or vegetables may be quickly, evenly, and perfectly evaporated, so as to produce evaporated fruits or vegetables of uniform and superior quality, and which in its construction shall be simple and adapted to be operated easily. This we accomplish in the manner and by the arrangement of parts hereinafter described and claimed.

In carrying out our invention as illustrated in the drawings, A represents the steam-supply pipe through which steam is introduced into the apparatus.

B B' B² B³, &c., represent steam-pipes communicating therewith, said pipes arranged in series preferably parallel with each other upon planes one above another slightly inclined from a horizontal position, so that condensed water may easily escape therefrom, the pipes in each of said planes being joined together directly or indirectly at each end, or upon alternate ends, as shown at $b\ b'\ b^2\ b^3$, &c., so as to form a continuous communication for the passage of steam to and fro through the desired series of planes, and connected with the common waste-pipe C at the bottom. These planes are arranged at suitable distances apart, so as to permit the insertion of fruit-trays D D' D² D³, &c., between them. We prefer to arrange two or more trays, one above the other, in each of said spaces between any two planes of steam-pipes. By constructing these planes of suitable length it is evident that a series of trays of proper width may be arranged in each of said spaces, as indicated more particularly in Fig. 1, said series being numbered in the drawings 1 2 3, &c., arranged in tiers of any desired number. These trays may be made of any suitable material—as, for instance, of wooden frames provided with wire-cloth bottoms, so that there will be free circulation between them.

E represents a suitable frame-work for supporting the trays. This frame-work is inclosed with a casing of boards or brick or other suitable material, F, leaving openings, F' for the insertion and removal of the trays. F² is any suitable cover. We prefer that these openings should be constructed somewhat larger than may be necessary for the admission of the trays, so as to leave a free space for a draft of air to enter thereby, as shown in Fig. 1.

G is a draft or vapor flue, located at the rear of the trays, between them and the rear portion of the casing, communicating with the hot-air and vapor chamber G' at the top of the series of trays, between them and the cover.

G² are outlet-flues communicating with the vapor-flue G and the vapor-chamber G', whereby the vapor generated may escape.

We prefer to provide at the bottom of the trays a series of doors, H H' H² H³, &c., which may be removed or opened for cleaning the apparatus. We also prefer to construct in said doors small openings $h\ h'\ h^2\ h^3$, &c., whereby a draft of air may enter in for the purpose of more effectually carrying off the moisture. It is evident that in a drying apparatus so constructed a free circulation is provided for the escape of the moisture. It is also evident that an even and uniform distribution of heat can be maintained among the several trays of fruit.

In the drawings we have shown the pipes in each plane bent or cured downward on opposite ends, each pipe forming thus a continuous passage for the steam from plane to plane through the desired series of planes from the supply-pipe to the waste-pipe; but it is evident that the pipes on each plane may be connected with those of the next plane, thus directly or in a different manner from that shown without departing from the principle of our invention—as, for instance, the series of pipes in each plane may communicate with a pipe at right angles thereto located on one or both ends of each plane and having one or more connections with the pipe on the next plane; or a number of perpendicular pipes may be located at one or both ends of said planes, corresponding to the number of pipes in each plane, and having connection therewith in such a manner that steam may have a free passage through the different planes of pipes.

We would have it understood that we do not limit ourselves to any particular method of uniting the steam-pipes of one plane with those of the next plane, as any method by which steam may circulate through the series of pipes in each plane is contemplated as coming within the scope of our invention.

It is obvious that, instead of inserting all the fruit-trays into the spaces between the planes of steam-pipes from one side, they may be inserted therein from alternate ends, if preferred.

What we claim is—

In a fruit-drier, the combination of the inclosing-casing F, having draft-openings at its base, outlet-flues at its top, and a series of openings, F', for the introduction of trays containing the material to be dried, and a series of steam-pipes arranged in planes one above another and each plane of pipes connected at one end with one end of the adjacent plane to form a continuous channel from the supply-pipe to the waste-pipe, so that the steam in one plane will pass therefrom into the next plane, a vertical draft or vapor flue, G, located between the rear of the planes and the inclosing-casing, and a vapor-chamber, G', located horizontally between the top plane of pipes and the top of the said casing, substantially as and for the purpose described.

In testimony whereof we sign this specification in the presence of two witnesses.

LEWIS GRANGER.
EZRA F. SIBLEY.

Witnesses:
JONAS S. SUTTON,
WM. H. CLARK, Jr.